W. M. BONWILL.
Corn Harvester.
No. 14,344.
Patented March 4, 1856.
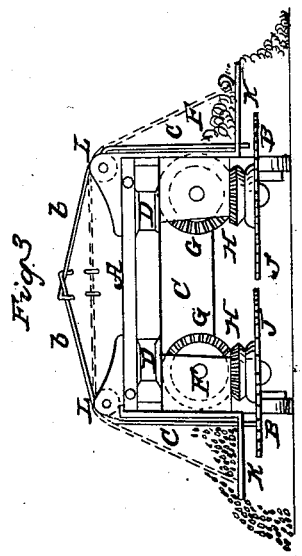
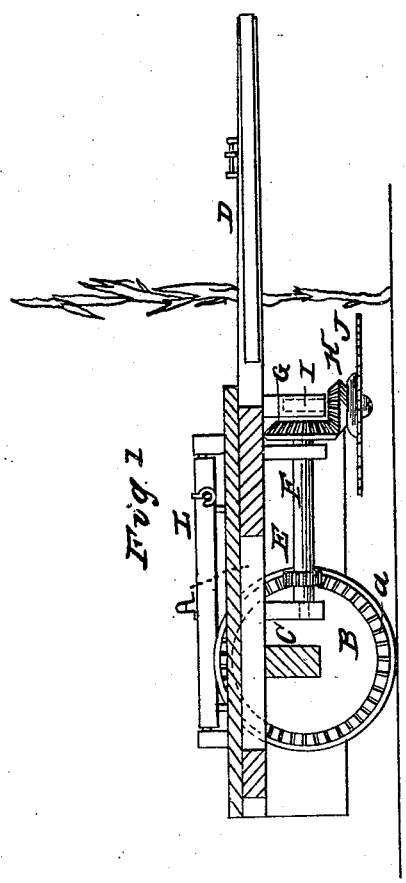
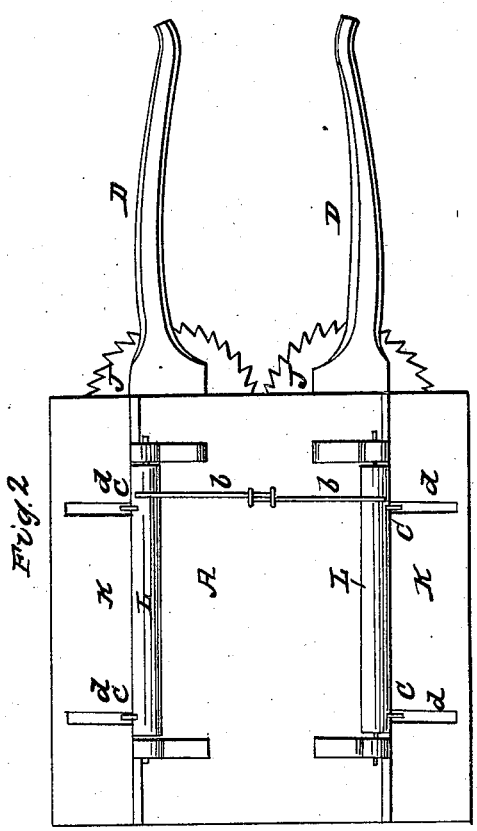

UNITED STATES PATENT OFFICE.

WM. M. BONWILL, OF CAMDEN, DELAWARE.

IMPROVEMENT IN CORN-HARVESTERS.

Specification forming part of Letters Patent No. 14,344, dated March 4, 1856.

*To all whom it may concern:*

Be it known that I, WILLIAM M. BONWILL, of Camden, in the county of Kent and State of Delaware, have invented a new and improved machine for cutting standing cornstalks and depositing them in sheaves or bundles upon the ground; and I do hereby declare that the following is a full, clear, and exact description of the same, reference being had to the annexed drawings, making a part of this specification, in which—

Figure 1 is a longitudinal vertical section of my improvement, the plane of section being through the center. Fig. 2 is a plan or top view of the same. Fig. 3 is a front view of the same.

Similar letters of reference indicate corresponding parts in the several figures.

To enable those skilled in the art to fully understand and construct my invention, I will proceed to describe it.

A represents a platform, which is supported by two wheels, B B, the axle C of the wheels being permanently attached to the platform. To the front end of the platform shafts D are attached.

On the inner side of each wheel B there is an annular toothed rim, $a$, in which pinions E gear, said pinions being upon shafts F F, which extend to the front end of the platform. The outer ends of the shafts F F have beveled wheels G G, which gear into beveled pinions H H, which are hung upon the lower ends of vertical shafts I, underneath the front end of the platform A.

Underneath the beveled pinions H H, and upon the same shafts, there are attached circular saws J J, a saw being at each side of the front end of the platform, as shown clearly in Figs. 2 and 3.

To each side of the platform A there are attached horizontal plates or beds K. The plates or beds are just above the saws J J, and extend the whole length of the platform.

On the upper surface of the platform A there are placed two shafts, L L, one at each side of the platform, and to each shaft there is attached a rod, $b$. The inner ends of the two rods are connected by eyes, so that they may be worked up and down and turn the shafts L L a certain distance. To each shaft L there are attached two rods, $c\,c$, the lower ends of which rae fitted in transverse slots $d\,d$, made in the plates or beds K K.

Operation: As the machine is drawn along the saws J J are rotated or driven from the wheels B B by means of the gearing previously described, and the saws cut the standing stalks, each saw being in line with a row. The cut stalks fall upon the plates or beds K K, and when a sufficient quantity is upon the plates or beds the driver depresses the inner ends of the rods $b\,b$, and the lower ends of the rods $c\,c$ are thrown outward thereby, and the stalks are thrown from the plates or beds upon the ground. The driver then raises the inner ends of the rods $b\,b$, so that the rods $c\,c$ may be in a vertical position by the sides of the platform and allow the cut stalks to again fall upon the plates or beds.

The above implement is extremely simple, economical to manufacture, and not liable to get out of repair.

I do not claim the circular saws for cutting the stalks, for they have been previously used, but arranged differently from the way herein shown.

What I claim as new, and desire to secure by Letters Patent, is—

The two saws J J, placed at the front part and at each side of the platform A, in combination with the horizontal plates or beds K K and discharging-rods $c\,c$, arranged substantially as herein shown and described, for the purpose specified.

WILLIAM M. BONWILL.

Witnesses:
THOMAS SIMPSON,
WM. G. A. BONWILL.